(12) United States Patent
Saeed

(10) Patent No.: US 9,815,558 B2
(45) Date of Patent: Nov. 14, 2017

(54) ANTI-ICING APPARATUS AND SYSTEM

(71) Applicant: King Fahd University of Petroleum and Minerals, Dhahran (SA)

(72) Inventor: Farooq Saeed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 239 days.

(21) Appl. No.: 14/963,708

(22) Filed: Dec. 9, 2015

(65) Prior Publication Data
US 2017/0166313 A1    Jun. 15, 2017

(51) Int. Cl.
*B64D 15/04* (2006.01)
*B64D 15/16* (2006.01)
*B64D 29/00* (2006.01)
*B64D 33/02* (2006.01)

(52) U.S. Cl.
CPC .............. *B64D 15/04* (2013.01); *B64D 15/16* (2013.01); *B64D 29/00* (2013.01); *B64D 2033/0233* (2013.01)

(58) Field of Classification Search
CPC . B64D 15/02; B64D 15/04; B64D 2033/0233
See application file for complete search history.

(56) References Cited

U.S. PATENT DOCUMENTS

| 4,398,688 | A | * | 8/1983 | Williams | ................. B64C 3/50 244/207 |
| 5,841,079 | A | | 11/1998 | Parente | |
| 6,467,730 | B2 | | 10/2002 | Laugt | |
| 8,336,828 | B2 | * | 12/2012 | Shmilovich | .............. B64C 9/18 244/207 |
| 2017/0217593 | A1 | * | 8/2017 | Ishida | ................... B64D 15/04 |

FOREIGN PATENT DOCUMENTS

| WO | WO 2011/111405 A1 | 9/2011 |
| WO | WO 2015/059489 A1 | 4/2015 |

* cited by examiner

*Primary Examiner* — Brian M O'Hara
(74) *Attorney, Agent, or Firm* — Oblon, McClelland, Maier & Neustadt, L.L.P.

(57) ABSTRACT

An anti-icing apparatus includes an anti-icing piccolo tube for an aircraft component with a plurality of self rotating elements. Each self rotating element of the plurality of self rotating elements includes a first inlet to receive a working fluid, a second inlet to receive the working fluid, a peripheral layer that connects the first inlet and the second inlet, and a plurality of outlets placed on the peripheral layer that expulses the working fluid through jets. The jets rotate each self rotating element and dynamically impinges the working fluid on an internal surface of the aircraft component.

20 Claims, 7 Drawing Sheets

ANTI-ICING APPARATUS AND SYSTEM

BACKGROUND

Field of the Disclosure

The present disclosure relates to anti-icing systems for preventing ice accumulation in aircrafts.

Description of the Related Art

Anti-icing systems preventing the accumulation of ice are essential for safe operation of aircrafts. Without an anti-icing system and under icing weather conditions, critical components such as wings, slats, engine inlets, engine struts, radar domes, and vertical and horizontal stabilizers, may quickly accumulate quantities of ice. The accumulation of ice may be so severe that the shape and the proper function of the critical components are substantially impaired, which ultimately can lead to a complete loss of control and/or insufficient lift required to keep the aircrafts airborne.

Conventional anti-icing systems rely on flowing a working fluid, e.g. heated air from the engine, inside internal volumes of the critical components of the aircraft for deicing. In these conventional anti-icing systems, the flow of hot air is generally distributed by fixed structures, e.g. perforated conduits or piccolo tubes, that impinge the working fluid on internal surfaces of the critical components via a plurality of stagnation points. Such a plurality of stagnation points generates a non-uniform heat distribution on the internal surfaces as well as a non-uniform heat mixing of the working fluid inside the internal volumes.

Such non-uniform heat distribution and mixing may result in a non-uniform heating of the critical components of the aircraft. Consequently, these conventional anti-icing systems may need to either operate for a longer time or use a greater amount of working fluid to effectively protect the critical components from ice accumulation. In other words, these conventional systems may require important energetic resources from the aircraft and may not be able to effectively protect large surfaces against ice accumulation. Further, these conventional anti-icing systems may produce important spatial variations of temperature throughout the surfaces being protected and may impose stress and metal fatigue on these critical components.

Thus, an anti-icing apparatus and system solving the aforementioned of effectiveness and efficiency are desired.

SUMMARY

Accordingly, the object of the present disclosure is to provide an anti-icing apparatus and system which overcome the above mentioned limitations.

The anti-icing apparatus and system of the present disclosure ensure effectiveness and efficiency due to a dynamic distribution of a working fluid, e.g. hot air, inside critical components and components of an aircraft that are prone to ice accumulation.

Such dynamical distribution of the working fluid is implemented by a piccolo tube employing self rotating elements. The self rotating elements generate jets of working fluid that rotate around the piccolo tube. The jets are issued from nozzles on the surface of the self rotating element and produce, via thrust, a sufficiently strong torque to rotate the self rotating elements around the piccolo tube.

As a first result of the rotation of the self rotating elements, the jets continuously sweep internal surfaces of the critical component of the aircraft. In other words, the jets impinge along entire inner circumferences of the critical components. Such a distribution of the jets leads to a more uniform and more efficient heating of the critical components of the aircraft. As a second result of the rotation of the self rotating elements, the working fluid inside internal volumes of the critical components undergoes an important mixing leading to a more uniform and efficient heat distribution.

In one non-limiting illustrative example, an anti-icing apparatus to prevent ice accumulation is presented. The anti-icing apparatus includes an anti-icing piccolo tube for an aircraft component with a plurality of self rotating elements. Each self rotating element of the plurality of self rotating elements includes a first inlet to receive a working fluid, a second inlet to receive the working fluid, a peripheral layer that connects the first inlet and the second inlet, and a plurality of outlets placed on the peripheral layer that expulses the working fluid through jets. The jets rotate each self rotating element and dynamically impinges the working fluid on an internal surface of the aircraft component.

In another non-limiting illustrative example, an anti-icing system to prevent ice accumulation on a component of an aircraft is presented. The anti-icing system includes a chamber that heats the component through a working fluid from an engine of the aircraft, a bleed duct placed behind the chamber that bleeds the working fluid, a piccolo tube routed inside the chamber that receives the working fluid from the bleed duct, and a plurality self rotating elements connected to the piccolo tube that dynamically distributes the working fluid into the chamber. Each self rotating element of the plurality of self rotating elements includes, a first inlet to receive the working fluid from the piccolo tube, a second inlet to receive the working fluid from the piccolo tube, a peripheral layer that connects the first inlet and the second inlet, and a plurality of outlets placed on the peripheral layer that expulses the working fluid through jets. The jets rotate each self rotating elements and dynamically impinges the working fluid on an internal surface of the chamber.

BRIEF DESCRIPTION OF THE SEVERAL VIEWS OF THE DRAWINGS

To easily identify the discussion of any particular element or act, the first digit or digits in a reference number refer to the figure number in which that element is first introduced.

DETAILED DESCRIPTION

Figure 1:
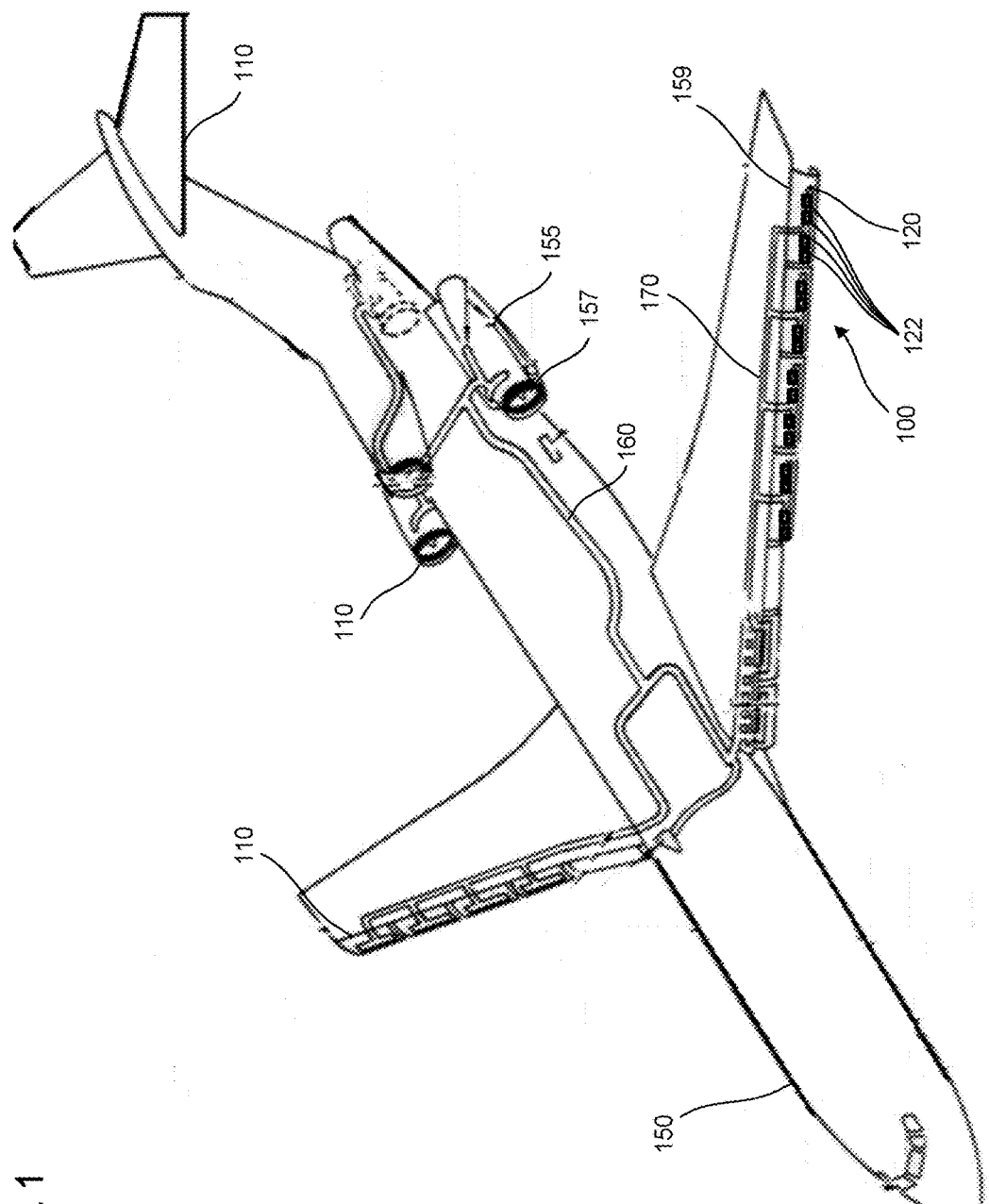
FIG. 1 is a perspective view of an aircraft with critical components protected by an anti-icing system, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

FIG. 1 is a perspective view of an aircraft 150 with critical components 110 protected by an anti-icing system 100, according to certain aspects of the disclosure.

The anti-icing system 100 permits the heating of the critical components 110 of the aircraft 150 to avoid atmospheric ice from accumulating. The critical components 110 may be tail surfaces, the wing surfaces, e.g. slats 159, and engine inlet surfaces, e.g. nacelle lips 157.

The effects of ice accumulation on the critical components 110 of the aircraft 150 can cause the shape of the surfaces of these critical components 110 to change, which can ultimately lead to a complete loss of control and/or insufficient lift required to keep the aircraft 150 airborne.

Figure 2A:
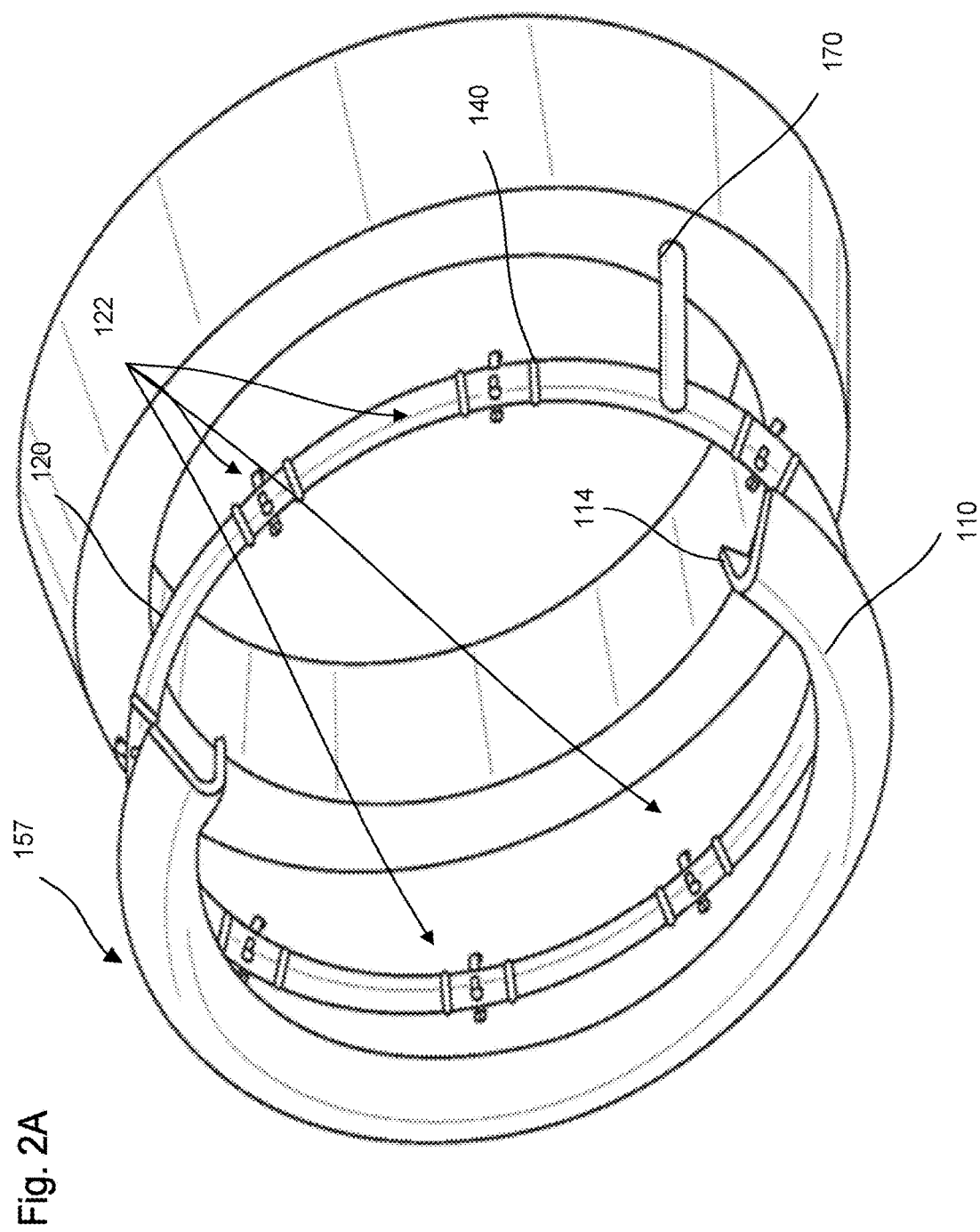
FIG. 2A is an exploded view of the anti-icing system embedded in a nacelle lip as one example of the critical components, according to certain aspects of the disclosure.
Figure 2B:
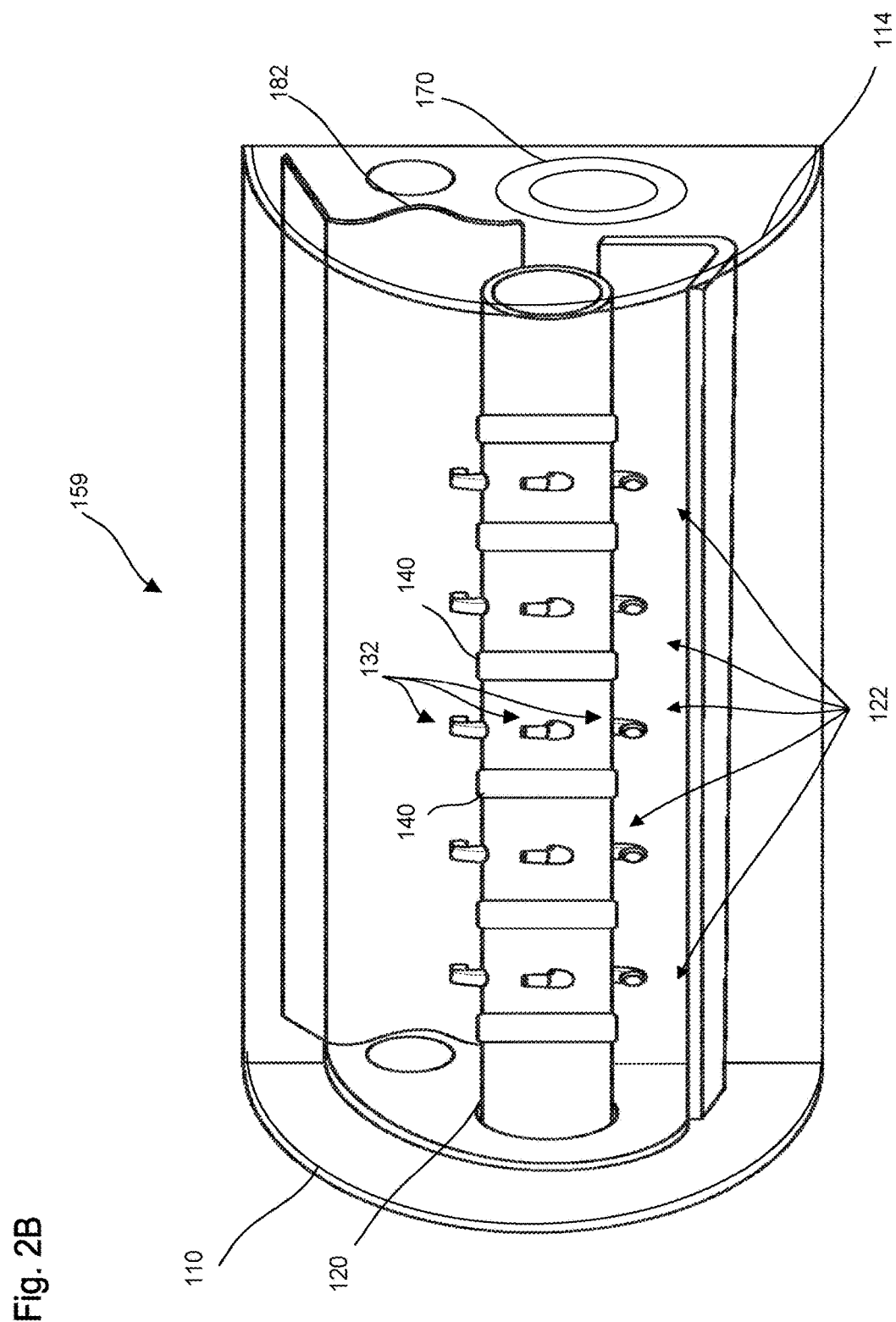
FIG. 2B is an exploded view of the anti-icing system embedded in a slat as one example of the critical components, according to certain aspects of the disclosure.
Figure 2C:
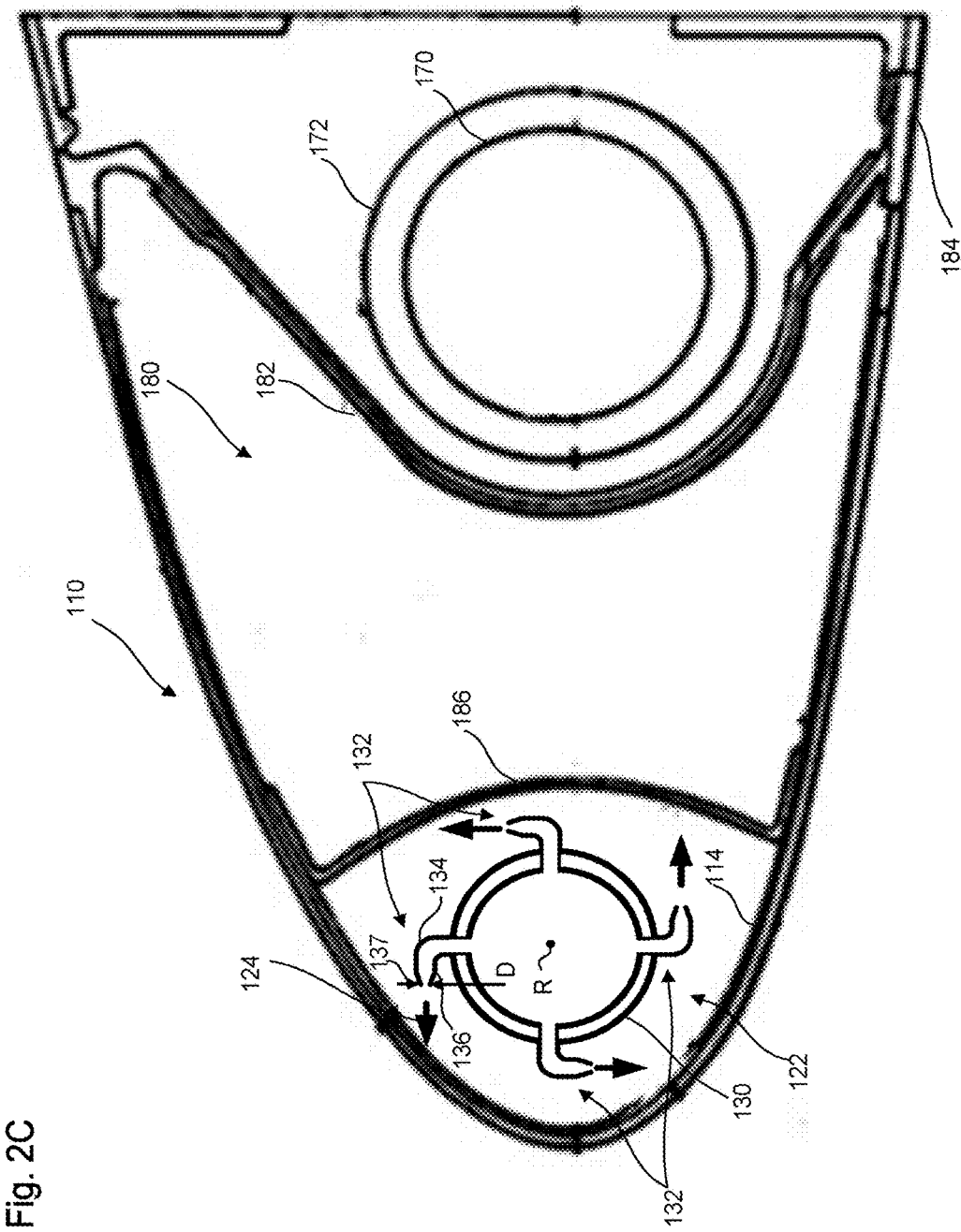
FIG. 2C is a cross section view of the anti-icing system embedded in the critical components, according to certain aspects of the disclosure.

The anti-icing system 100 relies on a piccolo tube 120 dynamically distributing a working fluid 160 on an inner surface 114, as illustrated in FIG. 2C, of the critical components 110. Such a dynamical distribution of the working fluid 160 is performed by a plurality of self rotating elements 122 of the piccolo tube 120. Each self rotating element of the plurality of self rotating elements 122 issues jets 124, as illustrated in FIG. 2C, of working fluid 160 in a self rotating motion around a central axis R of the respective self rotating element 122. The working fluid 160 may be air at high temperature and high pressure, e.g. about 200-250° C. and 275 kPa, produced by an engine 155 of the aircraft 150. To reach such a temperature and pressure, the working fluid 160 may be bled from a compressor stage of the engine 155.

Compared to a non-dynamical or fixed distribution such a dynamical distribution generates a long impingement area of the working fluid 160 on the inner surface 114 as well a thorough mixing of the working fluid 160 around the piccolo tube 120. Consequently, the energy from the working fluid 160 is utilized in warming a larger region of the inner surface 114 resulting in a more efficient and uniform prevention of atmospheric ice accumulation on critical components 110 as well as less demanding intake of energy for the engine 155 of the aircraft 150.

The piccolo tube 120 may take different shape depending on the geometry and/or type of the critical components 110 to protect against atmospheric ice accumulation.

In one aspect of the disclosed invention, the piccolo tube 120 may be a tube forming a loop that hugs the nacelle lip 157 of the engine 155, as illustrated in FIG. 2A, and the plurality of self rotating elements 122 is placed radially along the tube.

In another aspect of the disclosed invention, the piccolo tube 120 may be a straight tube following a slat 159, as illustrated in FIG. 2B, and the plurality of self rotating elements 122 is placed along the straight tube.

FIGS. 2A-2C are an exploded view of the anti-icing system 100 embedded in a nacelle lip 157, an exploded view of the anti-icing system 100 embedded in a slat 159 and a cross section view of the anti-icing system 100 embedded in the critical components 110, respectively and according to certain aspects of the disclosure.

The anti-icing system 100 includes the piccolo tube 120, a chamber 180 receiving the working fluid 160 from the piccolo tube 120 and a bleed duct 170 connected to the piccolo tube 120.

The chamber 180 is defined by the critical components 110, e.g. the slats 159, and extends along a length of the critical components 110. The fluid chamber 180 includes a front part enclosed by the inner surface 114 of the critical components 110, and a rear part obstructed by a rear baffle 182. In addition, the chamber 180 may include discharge slots 184 that may be placed at the juncture between the rear baffle 182 and the inner surface 114. The discharge slots 184 are configured to open the chamber 180 to the external environment and to close the chamber 180 from the external environment.

The bleed duct 170 may be placed outside the chamber 180 and behind the rear baffle 182 while the piccolo tube 120 may be routed inside the chamber 180 substantially close to an edge of the critical component 110.

The working fluid 160 is bled from compressor stage of the engine 155 to the piccolo tube 120 through the bleed duct 170. In order to maintain the energy of the working fluid 160 during the bleeding from the engine 155 to the piccolo tube 120, the bleed duct 170 may include a means of insulation. The means of insulation may be an insulating layer 172 wrapped around the bleed duct 170.

The working fluid 160 is then ejected from the piccolo tube 120 to the chamber 180 through the plurality of self rotating elements 122. Through the plurality of self rotating elements 122, the working fluid 160 is dynamically distributed throughout the chamber 180 by the jets 124 that rotate around the piccolo tube 120. The rotation of the jets 124 dynamically impinges the inner surface 114 with the working fluid 160 and dynamically mixes the working fluid 160 in the chamber 180.

Once, the working fluid 160 has been used to warm up the inner surface 114, and consequently the critical components 110, the working fluid 160 is evacuated from the chamber 180 to the external environment by opening the discharge slots 184.

In an aspect of the disclosed invention, the chamber 180 may be provided a front baffle 186 placed in front of the rear baffle 182 and behind the plurality of self rotating elements 122. The front baffle 186 may be used to further spread the warming of the critical components 110 by channeling and directing the working fluid 160 on the inner surface 114.

Although, the anti-icing system 100 is illustrated in FIGS. 2A-2B as being implemented for protecting the lip nacelle 157 and the slat 159, the implementation of the anti-icing system 100 to other critical component 110 is similar and consequently will not be described in this disclosure.

Figure 3A:
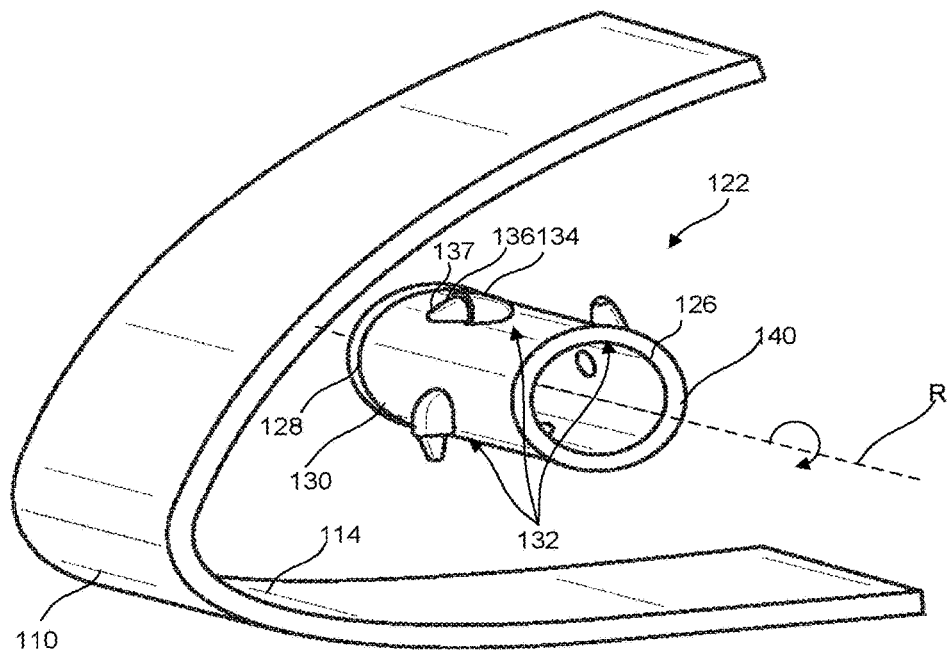
FIG. 3A is a perspective view of one self rotating element of a plurality of self rotating elements inside a chamber formed by the critical components, according to certain aspects of the disclosure.
Figure 3B:
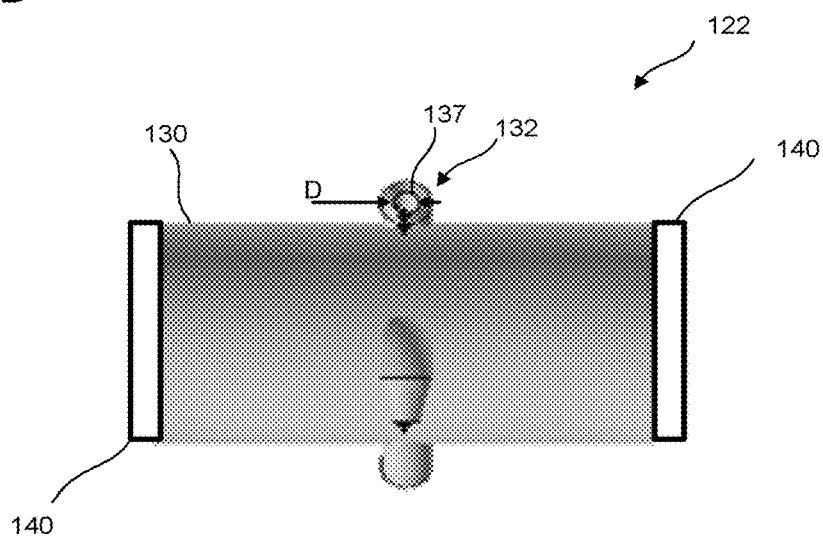
FIG. 3B is a front view of one self rotating element, according to certain aspects of the disclosure.

FIG. 3A is a perspective view of one self rotating element of the plurality of self rotating elements 122 inside the chamber 180, according to certain aspect of the disclosure. FIG. 3B is a front view of one self rotating element of the plurality of self rotating elements 122, according to certain aspect of the disclosure.

Each self rotating element of the plurality of self rotating element 122 has a tubular hollow shape and includes a first inlet 126 opposite a second inlet 128 and a peripheral layer 130 joining the first inlet 126 and the second inlet 128.

The peripheral layer 130 includes a plurality of outlets 132 that generates the jets 124 and the rotation motion of each self rotating element 122, see arrow in FIG. 3.

The peripheral layer 130 includes a plurality of outlets 132 to let the working fluid 160 exit each self rotating element 122 and generate the jets 124.

The outlets 132 may be configured to generate a torque on each self rotating elements 122 via a thrust from the jets 124 and enable each self rotating element 122 to rotate around an axis crossing the first inlet 126 and the second inlet 128. For example, the torque exerted on each self rotating element 122 may be generated by having the jets 124 lie on a tangent plane of the peripheral layer 130.

Each outlet of the plurality of outlets 132 may include an elbow fitting 134 connected on one side to the peripheral layer 130 and on another side to a nozzle 136. The nozzle 136 is opened into the chamber 180 via an orifice 137 generating the jets 124 of the working fluid 160.

Each orifice 137 has a diameter D and a normal direction N that can be configured to generate the jet 124 in a predetermined direction and at a predetermined momentum.

The rotation of each self rotating elements 122 under the action of the thrust may be implemented by rotating connectors 140 placed on the first inlet 126 and/or second inlet 128 of each self rotating element 122.

The rotating connectors 140 may be any kind of connecting device that enables to rotably affixed each self rotating element 122 together or to a supporting structure 141, e.g. a pipe, while allowing the circulation of the working fluid 160 between each self rotating element 122 or through the supporting structure. The rotating connectors 140 may also be used to reduce rotational friction between each self rotating element 122.

For example, the rotating connectors 140 may be rotary unions, swivel joints, rotary joints, bearings or any other type of rotating connectors 140 know by a person having ordinary skill in the art.

Each self rotating element 122, elbow fitting 134, and/or nozzle 136 may be molded or machined in one or several pieces assembled or fastened together using fastening techniques such as riveting, screwing, soldering or gluing. Each self rotating elements 122, the elbow fittings 134, and the nozzles 136 may be made from materials configured to handle high pressure and high temperature conditions imposed by the working fluid 160, such as stainless steel alloys.

In order to drive each self rotating element 122 and dynamical distribution dynamically the jets 124, the outlets 132 may take alternative aspects. For example, the outlets 132 may simply correspond to through holes, straight or curved, placed through the peripheral layer 130 to generate the jets 124 in directions which are not normal to an external surface of the peripheral layer 130. In another example, the outlets may correspond to straight radial though holes associated with curved blades protruding from the external surface of the peripheral layer 130. The curved blades may channel the working fluid 160 in directions which are not normal to the external surface of the peripheral layer 130 and consequently generate rotation of each self rotating element 122.

Figure 4A:
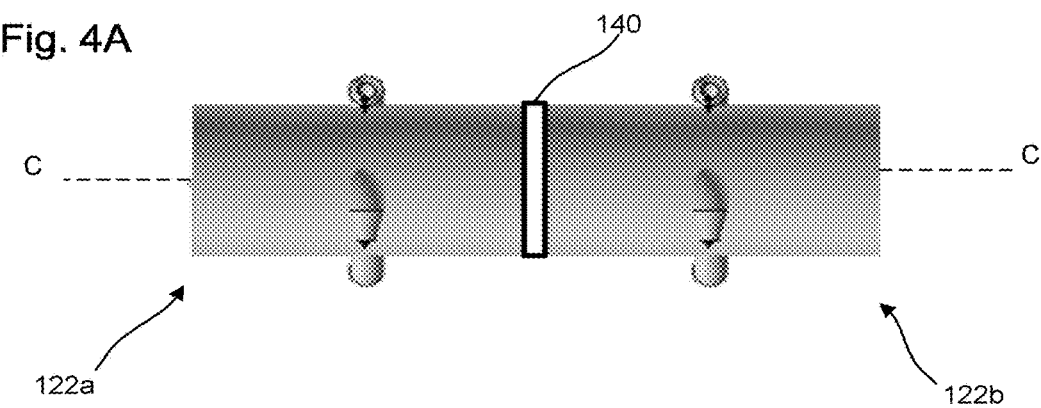
FIG. 4A is a front view of the plurality of self rotating elements in a first configuration, according to certain aspects of the disclosure.
Figure 4B:
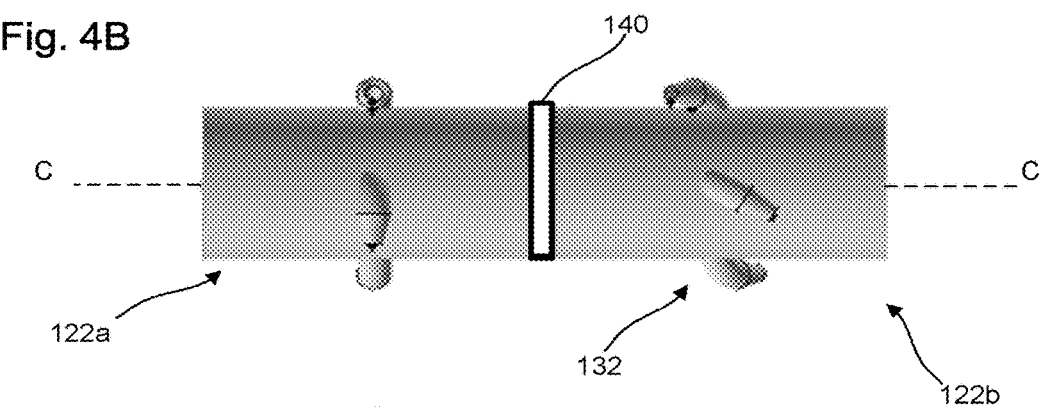
FIG. 4B is a front view of the plurality of self rotating elements in a second configuration, according to certain aspects of the disclosure.
Figure 4C:
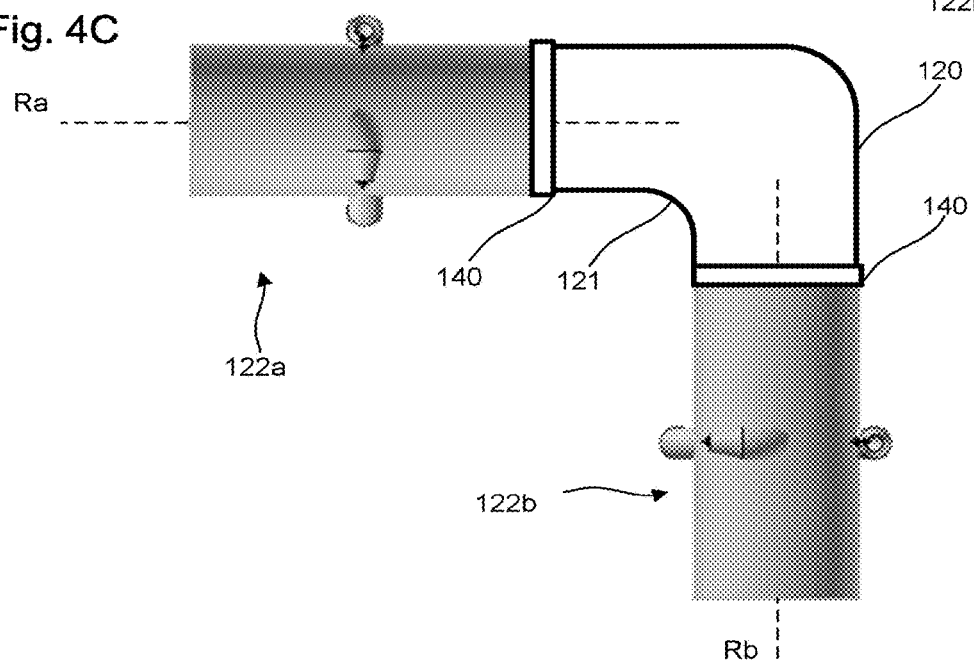
FIG. 4C is a front view of the plurality of self rotating elements in a third configuration, according to certain aspects of the disclosure.

FIG. 4A-4C are front views of the plurality of self rotating elements 122 in a first configuration, in a second configuration and in a third configuration, respectively and according to certain aspect of the disclosure.

The piccolo tube 120 and the plurality of self rotating elements 122 may be implemented through different and specific configurations, to optimize the distribution, impingement and mixing of the working fluid 160 depending on different requirements that might be imposed by the critical components 110. The different requirements may be related to the specific geometry, location, importance, and frequency of ice accumulation of the critical components 110. Each self rotating element 122 may have a specific number of outlets 132, a specific spatial repartition of outlets 132 on the peripheral layer 130 and each outlet 132 may have the nozzle pointing into a specific direction.

For example, the number of outlets 132 on each self rotating element 122 may be at least 1, preferably from 2 to 30, preferably 3 to 18, and preferably 4 to 6. In addition, the outlets 132 may be preferably placed equidistantly from each other along a circumference of the peripheral layer 130 or along a length of the piccolo tube 120.

In a first exemplary configuration, each self rotating element 122 may be affixed side by side and the plurality of self rotating elements 122 rotate together around a common axis C at a common angular velocity. This first configuration may be relevant to produce a periodic heat distribution along a length of the critical components 110.

For example and as illustrated in FIG. 4A, the first configuration may be implemented by having a first rotating element 122a of the plurality of self rotating elements 122 identical to a second rotating element 122b of the plurality of self rotating elements 122, wherein the first rotating element 122a and the second rotating element 122b are affixed side by side arranged symmetrically around the common axis C.

In a second exemplary configuration, each self rotating element 122 may be affixed side by side and rotate together around the common axis C but at different angular velocities, contrary to the first configuration. The second configuration, may be relevant to impinge different locations of the critical components 110 with different intensities and/or frequencies.

For example, the second configuration may be implemented by having the second self rotating elements 122 with nozzles 136 pointing into different directions, as illustrating in FIG. 4B, and/or with different diameters D.

In a third exemplary configuration, each self rotating element 122 may be placed with an inter-distance between each other to follow some of the curve of the piccolo tube 120. Further, each self rotating element 122 may rotate around a different axis.

For example and as illustrated in FIG. 4C, a first self rotating element 122a of the plurality of self rotating elements 122 may be placed at a distances from a second self rotating element 122b of the plurality of self rotating elements 122. Further, the first self rotating element 122a may rotate around a first axis Ra while the second self rotating element 122b may rotate around a second axis Rb, the first axis Ra and the second axis Rb being non-parallel.

Figure 5:
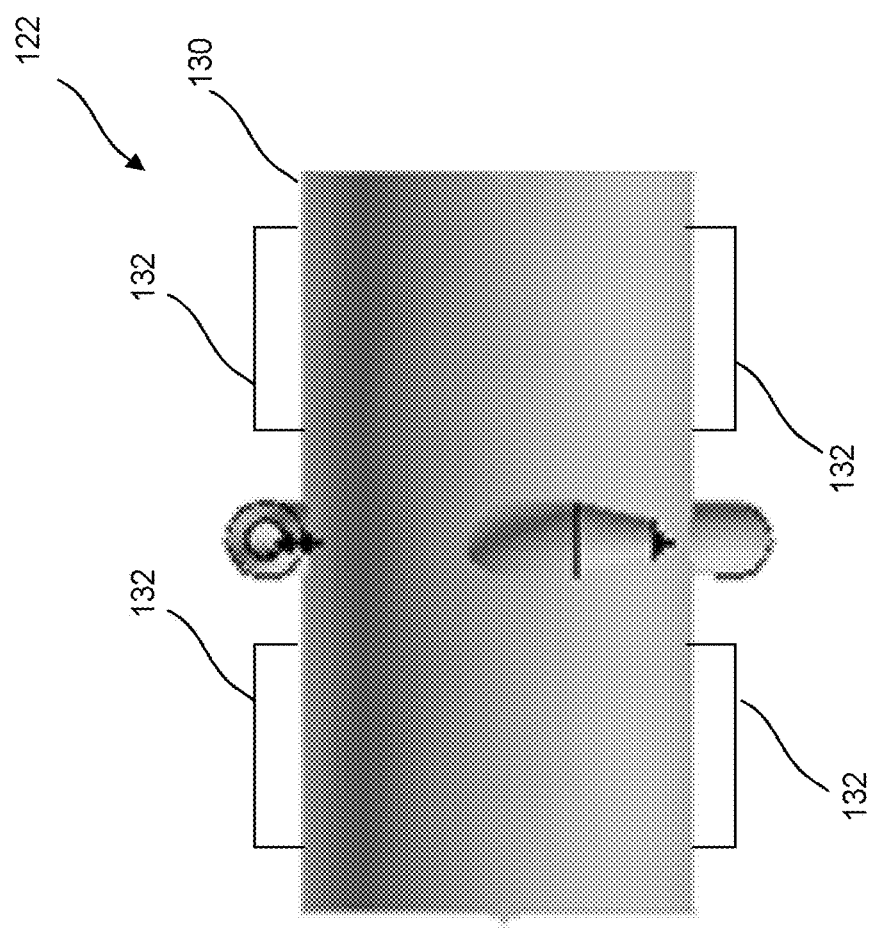
FIG. 5 is a front view of one self rotating element of the plurality of self rotating elements with mixing blades, according to certain aspects of the disclosure.

FIG. 5 is a front view of one self rotating element of the plurality of self rotating elements 122 with mixing blades 139, according to certain aspects of the disclosure.

In another aspect of the disclosure, the peripheral layer 130 of the self rotating elements 122 may include the mixing blades 139 to enhance the mixing of the working fluid 160 in the chamber 189 and consequently enhance the efficiency of the anti-icing system 100. The mixing blades 139 may be radial protrusions from the external surface of the peripheral layer 130 and may have a predetermined geometrical shape and a predetermined size to increase the swirling of the working fluid 160 and provide homogenization of heat distribution throughout the chamber 180. For example, the mixing blades 139 may be a plurality of radial ridges placed equidistantly around the external surface of the peripheral layer 130.

Numerous modifications and variations on the present disclosure are possible in light of the above teachings. It is therefore to be understood that within the scope of the appended claims, the disclosure may be practiced otherwise than as specifically described herein.

What is claimed is:

1. An anti-icing piccolo tube for an aircraft component with a plurality of self rotating elements, each self rotating element of the plurality of self rotating elements comprising:
    a first inlet to receive a working fluid;
    a second inlet to receive the working fluid;
    a peripheral layer that connects the first inlet and the second inlet; and
    a plurality of outlets placed on the peripheral layer that expulses the working fluid through jets,
        wherein the jets rotate each self rotating element and dynamically impinges the working fluid on an internal surface of the aircraft component.

2. The anti-icing piccolo tube as claimed in claim 1, wherein each outlet of the plurality of outlets is configured to expulse the working fluid on a tangent plane of an outer surface of the peripheral layer.

3. The anti-icing piccolo tube as claimed in claim 2, wherein each outlet is further configured to expulse the working fluid with a direction to directly impinge an area of the internal surface of the aircraft component.

4. The anti-icing piccolo tube as claimed in claim 1, wherein each outlet further includes an elbow fitting that connects the first inlet and the second inlet to a nozzle with an orifice.

5. The anti-icing piccolo tube as claimed in claim 4, wherein the orifice is configured to expulse the working fluid on a tangent plane of an outer surface of the peripheral layer.

6. The anti-icing piccolo tube as claimed in claim 4, wherein the orifice is configured to expulse the working fluid with a direction to directly impinge an area of the internal surface of the aircraft component.

7. The anti-icing piccolo tube as claimed in claim 1, wherein each self rotating element includes a rotating connector that reduces rotational friction.

8. The anti-icing piccolo tube as claimed in claim 1, wherein the plurality of self rotating elements includes at least two self rotating elements affixed side by side that rotate together around a common axis at a common angular velocity.

9. The anti-icing piccolo tube as claimed in claim 1, wherein the plurality of self rotating elements includes at least two self rotating elements affixed side by side that rotate together around a common axis at different angular velocity.

10. The anti-icing piccolo tube as claimed in claim 1, wherein the plurality of self rotating elements includes at least two self rotating elements separated by an inter-distance to follow a curve of the piccolo tube.

11. An anti-icing system to prevent ice accumulation on a component of an aircraft comprising:
    a chamber that heats the component through a working fluid from an engine of the aircraft;
    a bleed duct placed behind the chamber that bleeds the working fluid;
    a piccolo tube routed inside the chamber that receives the working fluid from the bleed duct; and
    a plurality self rotating elements connected to the piccolo tube that dynamically distributes the working fluid into the chamber, each self rotating element of the plurality of self rotating elements including:
        a first inlet to receive the working fluid from the piccolo tube;
        a second inlet to receive the working fluid from the piccolo tube;
        a peripheral layer that connects the first inlet and the second inlet, and
        a plurality of outlets placed on the peripheral layer that expulses the working fluid through jets,
            wherein the jets rotate each self rotating elements and dynamically impinges the working fluid on an internal surface of the chamber.

12. The anti-icing system as claimed in claim 11, wherein the chamber further includes a baffle to direct the working fluid on an inner surface of the chamber.

13. The anti-icing system as claimed in claim 12, wherein the chamber further includes discharge slots that discharge the working fluid from the chamber.

14. The anti-icing system as claimed in claim 11, wherein each outlet of the plurality of outlets is configured to expulse the working fluid on a tangent plane of an outer surface of the peripheral layer.

15. The anti-icing system as claimed in claim 11, wherein each outlet is further configured to expulse the working fluid with a direction to directly impinge an area of the internal surface of the component.

16. The anti-icing system as claimed in claim 11, wherein each outlet further includes an elbow fitting that connects the first inlet and the second inlet to a nozzle with an orifice.

17. The anti-icing system as claimed in claim 16, wherein the orifice is configured to expulse the working fluid on a tangent plane of an outer surface of the peripheral layer.

18. The anti-icing system as claimed in claim 16, wherein the orifice is configured to expulse the working fluid with a direction to directly impinge an area of the internal surface of the aircraft component.

19. The anti-icing piccolo tube as claimed in claim 11, wherein each self rotating element includes a rotating connector that reduces rotational friction.

20. The anti-icing system as claimed in claim 11, wherein each self rotating element further includes a plurality of mixing plates that mixes the working fluid inside the chamber.

* * * * *